(12) United States Patent
Fruechtenicht

(10) Patent No.: US 6,279,929 B1
(45) Date of Patent: Aug. 28, 2001

(54) SURFING SCOOTER

(76) Inventor: Robert D. Fruechtenicht, 30 Berkeley, San Anselmo, CA (US) 94960

( * ) Notice: Subject to any disclaimer, the term of this patent is extended or adjusted under 35 U.S.C. 154(b) by 745 days.

(21) Appl. No.: 08/962,902

(22) Filed: Nov. 3, 1997

Related U.S. Application Data

(63) Continuation of application No. 08/548,495, filed on Oct. 26, 1995, now abandoned.

(51) Int. Cl.$^7$ .................................................... B62M 1/00
(52) U.S. Cl. ...................................... 280/87.041; 280/263
(58) Field of Search ...................... 280/87.021, 87.041, 280/87.042, 5.24, 5.2, 87.05; 180/69.1, 68.1

(56) References Cited

U.S. PATENT DOCUMENTS

| | | | |
|---|---|---|---|
| D. 292,221 | 10/1987 | Mueller | D21/81 |
| 1,112,214 * | 9/1914 | Johnson | 280/87.021 |
| 1,516,105 | 11/1924 | Kinoshita | 280/87.041 |
| 1,531,710 * | 3/1925 | Mclaren | 280/87.041 |
| 1,591,581 | 7/1926 | Trejo | 280/87.041 |
| 1,617,337 | 2/1927 | Lees . | |
| 1,664,858 * | 4/1928 | Headley | 280/87.041 |
| 1,686,427 * | 10/1928 | Wallgren | 280/87.041 |
| 1,689,916 * | 10/1928 | Fisher | 280/87.041 |
| 1,701,410 | 2/1929 | Hornquist . | |
| 1,706,048 | 3/1929 | Van de Mark . | |
| 1,844,305 | 2/1932 | White . | |
| 2,319,066 | 5/1943 | Klatt et al. | 280/301 |
| 2,474,946 * | 7/1949 | Kinslow | 280/87.042 |
| 2,486,689 | 11/1949 | Tibores et al. | 280/87.04 |
| 2,926,927 * | 3/1960 | Enright | 280/87.021 |
| 2,953,389 * | 9/1960 | Green et al. | 280/87.042 |
| 3,006,659 * | 10/1961 | Krasnoff et al. | 280/87.041 |
| 3,153,543 * | 10/1964 | Magyar | 280/87.042 |
| 3,179,433 | 4/1965 | Flack | 280/8 |
| 3,992,029 * | 11/1976 | Washizawa et al. | 280/87.041 |
| 4,087,106 | 5/1978 | Winchell | 280/220 |
| 4,123,079 | 10/1978 | Biskup | 280/220 |
| 4,165,090 * | 8/1979 | Feddersohn et al. | 280/87.042 |
| 4,182,520 * | 1/1980 | Stevenson | 280/87.042 |
| 4,204,698 * | 5/1980 | Mihalik | 280/87.041 |
| 4,555,122 * | 11/1985 | Harvey | 280/87.041 |
| 4,770,262 * | 9/1988 | Yasynaga et al. | 180/69.1 |
| 4,828,284 * | 5/1989 | Sandgren | 280/87.041 |
| 4,842,091 | 6/1989 | Badsey | 180/219 |
| 4,991,861 | 2/1991 | Carn et al. | 280/87.042 |
| 5,100,161 * | 3/1992 | Tillyer | 280/87.042 |
| 5,470,089 * | 11/1995 | Whitson et al. | 280/87.041 |
| 5,620,189 * | 4/1997 | Hinderhofer | 280/5.24 |

FOREIGN PATENT DOCUMENTS

| | | | |
|---|---|---|---|
| 2-246887 * | 10/1990 | (JP) | 180/69.1 |
| 3-248981 * | 11/1991 | (JP) | 180/69.1 |
| 4-123989 * | 4/1992 | (JP) | 180/69.1 |
| 5-221362 * | 8/1993 | (JP) | 180/69.1 |

* cited by examiner

Primary Examiner—Robert P. Olszewski
Assistant Examiner—Andrew J. Fischer
(74) Attorney, Agent, or Firm—Brinks Hofer Gilson & Lione

(57) ABSTRACT

A two-wheel scooter-like vehicle is adapted for use by acrobatic adults by using not only the wheels, but a snag-free, omni-directional sliding surface, under a large standing area, which may be maneuvered by a rider into engagement with the ground and ground-supported objects to perform a variety of tricks and displays of acrobatic skill.

32 Claims, 3 Drawing Sheets

SURFING SCOOTER

This application is a continuation, of application Ser. No. 08/548,495, filed Oct. 26, 1995, now abandoned.

FIELD OF THE INVENTION

The invention relates to an adult two-wheel vehicle adapted for acrobatic use, particularly in the descent of steep inclines. More particularly this invention relates to a scooter-like vehicle for use in aggressive downhill off-road riding and the performance of acrobatic tricks and maneuvers while in rolling and/or sliding engagement with the ground and ground-supported objects or airborne.

BACKGROUND OF THE INVENTION

The two-wheel scooter has long been regarded as a child's toy, and while there have been various attempts made to improve the use of a scooter as a toy, for example, by combining the scooter and snow sled by the addition of runners which may be retractable, scooter-like vehicles have not been considered a source of adult entertainment or adapted for acrobatic use and the performance of tricks in the manner of bicycles, skateboards, motorcycles and other wheeled vehicles. The following U.S. patents relate to scooters and scooter-like vehicles in various suggested modifications: U.S. Pat. Nos. DES. 292,221; 4,991,861; 4,842,091; 4,123,079; 4,087,106; 3,179,433; 2,486,689; 2,319,066; 1,844,305; 1,706,048; 1,701,410; 1,689,916; 1,617,337; 1,591,581 and 1,516,015.

BRIEF STATEMENT OF THE INVENTION

This invention provides a two-wheel vehicle adapted for use by acrobatic adults by using not only the wheels, but a snag-free, omni-directional sliding surface, under a large standing area, which may be maneuvered by a rider into engagement with the ground and ground-supported objects to perform a variety of tricks and displays of acrobatic skill. Such an adult vehicle comprises a first means for providing a steerable front wheel that is free to rotate about a first axis of rotation carried by the first means; a second means connected with and supported by the first means, forming a spacious upper platform for carrying both feet of a standing rider in a variety of positions and locations and further forming a lower surface for omni-directional sliding engagement with the ground and ground-supported objects; and a third means connected with and supporting the second means and carrying a rear wheel rotatable about a second axis of rotation. In such an adult vehicle, the upper platform is supported by the first means and the third wheel means below the first and second axes of rotation but a few inches above the ground, and has, for example, a width of about 10 to 12 inches and a length of about 24 to 27 inches, to assist an acrobatic rider in displaying his abilities by performing a variety of tricks and feats of acrobatic skill. The lower surface of the second means preferably provides a snag-free, generally smooth and lubricous, surface with an upwardly slopping ramp-like front surface and snag-free, smooth lubricous side surfaces for multi-directional sliding engagement with the ground and ground-supported objects.

Vehicles of the invention are preferably provided with relatively large diameter wheels that roll easily on uneven, soft and turfed ground and can be "jumped" by an acrobatic rider onto and over ground-supported objects without bringing the vehicle to an abrupt stop.

Preferably, such wheels can be provided with air-filled and knob-treaded tires for engagement with the ground and reduced slippage and for providing pneumatic cushioning for the rider, particularly, when the vehicle is directed in the contact with ground-supported objects. The first means will include a handlebar permitting the rider to ride and control the vehicle and it is preferable that the handlebar be provided with brake actuators to independently operate brakes for the front and rear wheels.

Such a vehicle is particularly adapted for operation on steep inclines and hills and provides a rider the ability to control and direct his descent and to enjoy speed, and the ability to veer the vehicle rapidly, the ability to become airborne off of ground dislocations, the ability to slidably engage the ground and ground-supported objects such as logs, concrete curbs, and the ability to perform tricks while sliding or airborne in a manner similar to skilled riders of skateboards and skis.

Other features of this invention will be apparent from the drawing and the further and more detailed description of the invention that follows.

DETAILED DESCRIPTION OF THE INVENTION

Figure 1:
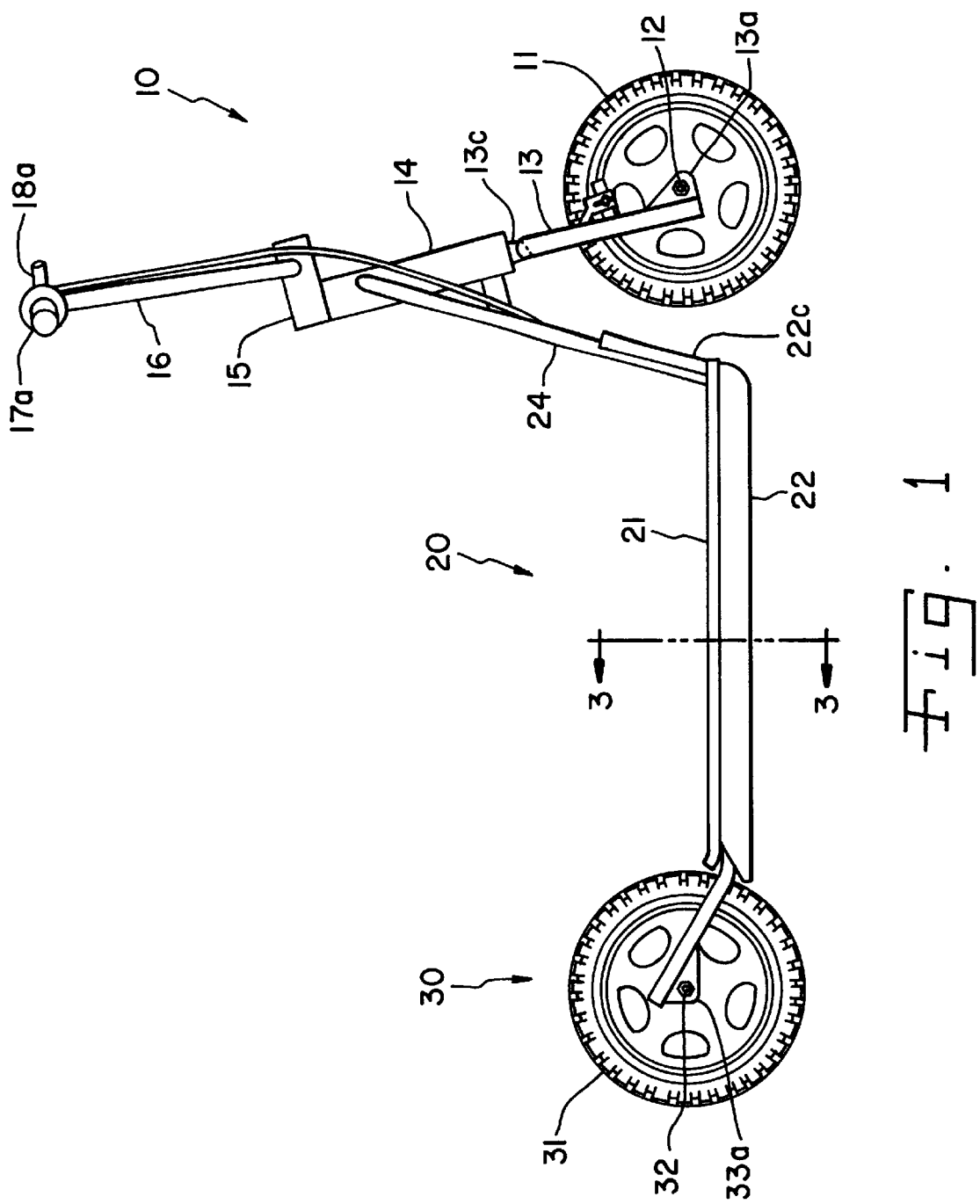
FIG. 1 is a side view of a vehicle of the invention.

The drawings depict the most current prototype of the invention as the best mode of the invention currently known to the inventor.

As shown in the drawings and as described below, the scooter-like vehicles of the invention include a structure and features permitting an acrobatic rider to travel rapidly down inclines and to direct the vehicle portion under the standing platform into engagement with the ground or ground-supported objects, or over moguls or dislocations in the ground surface to become airborne. With embodiments of the invention, the multi-directional sliding under-surface of the vehicle can, with skill, be slid along a ground-supported object such as a log or concrete curb while the rider balances the vehicle so the wheels are free of ground engagement. In addition, such vehicle can be directed off moguls or discontinuities in the ground surface to become airborne where the rider can acrobatically manipulate his body and the vehicle.

Figure 4:
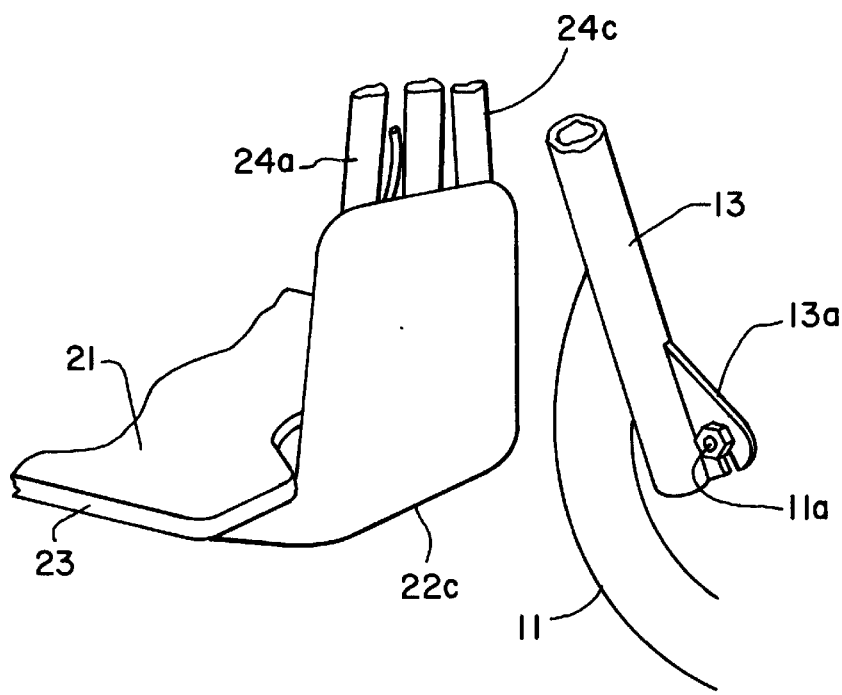
FIG. 4 is a partial perspective view showing the upwardly sloping ramp-like portion of the sliding surface immediately behind the front wheel of the vehicle.
Figure 5:
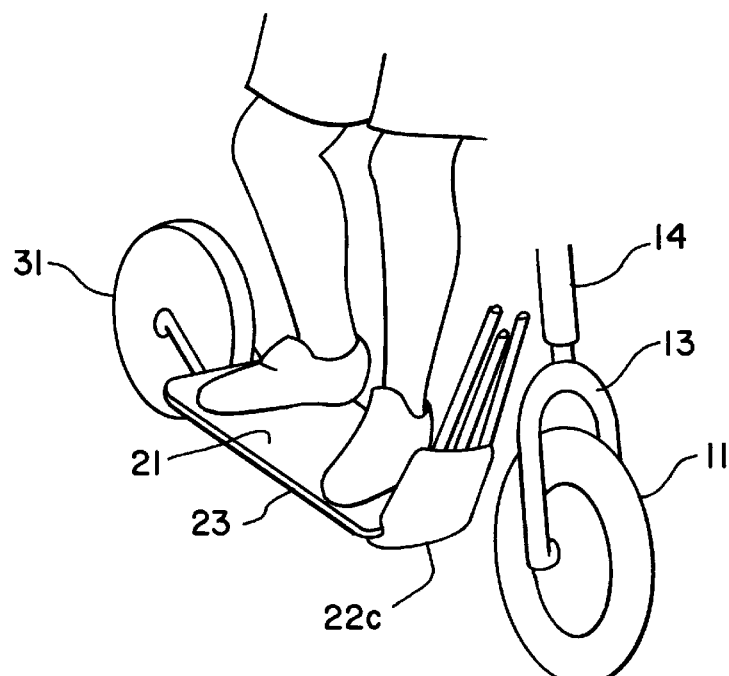
FIG. 5 is a partial perspective view showing a vehicle rider standing in a surfer position on the platform portion of the second means of the invention.

Accordingly, as shown in the drawings, a vehicle 100 of the invention can comprise a first means 10 for providing a steerable front wheel 11 that is rotatable about a first axis of rotation 12, a second means 20 connected with and supported by the first means 10 in forming a spacious upper platform 21 with sufficient surface area for carrying both feet of a standing rider in a variety of positions and locations, and a lower surface 22 for slidably engaging the ground and ground-supported objects, and a third means 30 providing a rear wheel 31 connected with and supporting the second means 20 with the wheel rotatable about a second axis of rotation 32. As best shown by FIGS. 1, 4 and 5, in a preferred embodiment the upper platform 21 is supported by the first means 20 and the third means 30 below the axes of rotation 12, 32 of the first and second wheels 11, 31.

In the embodiment shown in the drawings, the first means 10 carries the first wheel 11 by a tubular fork 13 that includes, at its lower end, a pair of tabs 13a, 13b projecting forwardly from the opposite sides of fork 13 and including openings, such as downwardly opening slots, into which the axle 11a of the first wheel 11 is fastened. The axle 11a and the means by which the first wheel is rotatably fastened to the tabs 13a, 13b of the tubular fork 13 are well known in the art. As is also well known in the art, a shaft 13c projects upwardly from the fork 13 through a sleeve 14 of the first means 10 in which it is rotatably carried and projects further upwardly above the sleeve 14 to carry a fastener 15 for transversely fastening a handlebar 16. The ends of the handlebars are provided with grips 17a and 17b for the vehicle rider. Thus, a vehicle rider by pulling or pushing on one or both ends of the handlebar 16 may steer the front wheel 11 and direct the vehicle as he pleases.

While the drawings show the first means 10 as comprising a rod 13c rotatably mounted in a sleeve 14 to permit the vehicle to be steered, as well known in the art, it will be apparent that other means may be devised to pivotably carry a front wheel and permit a rider to steer the vehicle. In addition, the fork 13 can be a "suspension" type so impacts on the front wheel 11 can be absorbed by a spring or an air, oil or rubber shock-absorbing system.

Figure 2:
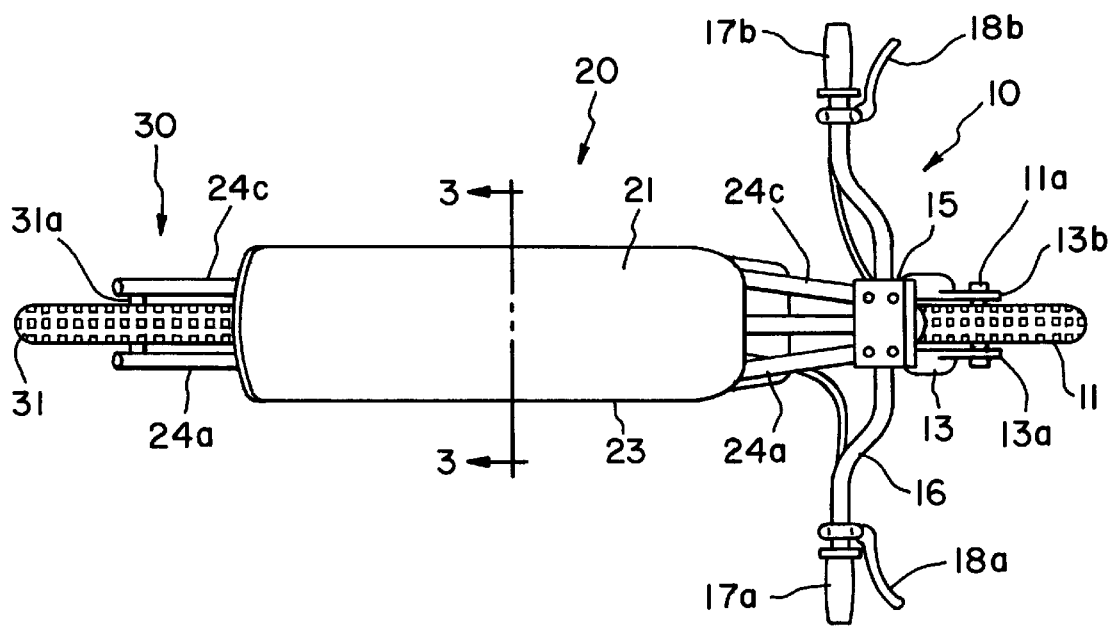
FIG. 2 is a top view of the vehicle of FIG. 1.
Figure 3:
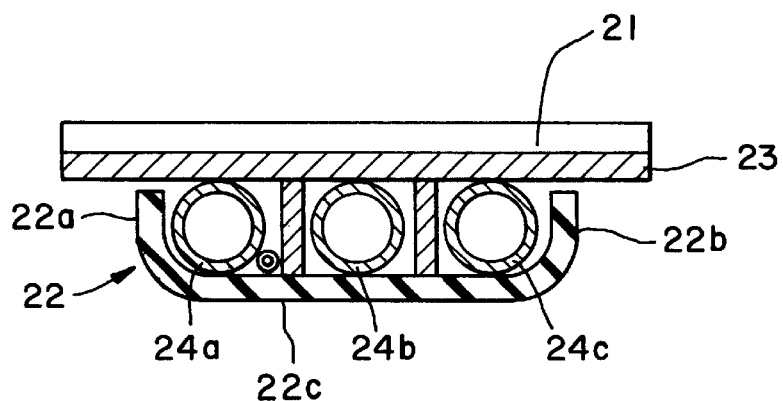
FIG. 3 is a cross-sectional view taken at the plane of lines 3—3 of FIGS. 1 and 2.

In the embodiment shown in the drawings, the second means 20 comprises a platform 21 supported by a frame 24 connected and supported by the first means 10. As indicated in FIG. 3, which is a cross-sectional view at the plane of line 3—3 of FIGS. 1 and 2 through the central portion of the second means 20, the frame 24 can comprise a plurality of tubular elements 24a, 24b, 24c lying under the means 23 forming the platform 21. The frame 24 slopes upwardly and forwardly from the forward end of the platform forming means 23 as shown in FIGS. 1, 2 and 4 and is welded to the sleeve 14 of the first means 10. As indicated by FIGS. 2 and 5, the platform 21 is wider than the frame 24 and provides adequate room for both feet of a rider to be variously positioned transversely of the platform 21. In addition, the platform 21 is long, permitting the rider to position both feet in the forward portion of the platform or in the rear-ward portion of the platform or to spread his feet widely on the platform to maintain his balance, as indicated in FIG. 5.

As also indicated by FIG. 3, the second means 20 includes a snag-free lower surface 22 under the frame 24 adapted for omni-directional slidable engagement with the ground and ground-supported objects. The lower surface 22 includes side portions 22a and 22b extending upwardly around the sides of the frame 24 to provide sliding surfaces on each side of the under portion of the vehicle. Furthermore, as shown in the figures, particularly. FIGS. 1, 4 and 5, the somewhat planar lower surface portion 22c of the second means extends upwardly in a ramp-like fashion forwardly of the frame 24 to provide a ramp-like surface permitting the vehicle to be slid by the rider up and onto ground-supported objects. The lower surface portion thus provides a snag-free, omni-directional sliding surface that can slidably engage the surface of the ground or the surfaces of ground-supported objects in any direction with its smooth planar lower surface 22c and its smooth side edges 22a, 22b.

As indicated in the drawings, the means 23 forming the platform 21 and the means forming the lower surface 22 can be fastened together, sandwiching the frame 24 therebetween. Because the means forming the lower surface 22 is subjected to impact and sliding engagement with ground-supported objects such as trees, boulders, curbs and the like, it is advantageous that it be removably fastened to the vehicle 100 to permit its replacement in the event it becomes broken or torn. It is likewise advantageous that the standing platform 21 be formed by means 23 that are removable from the second means 20 to permit its replacement in the event that the platform becomes damaged as a result of vehicle's use. The means forming the platform, the frame and lower surface can, however, be combined in a single element serving as said second means 20.

The means forming the platform 23 may be molded plastic, fiber-reinforced plastic, molded press board, laminated wood or plastic, steel plate or any other surface-forming material having sufficient strength to support an adult who may weigh over 200 pounds.

The means forming the lower surface 22 should provide a smooth, snag-free surface that is generally lubricous. Such a surface may be formed by anyone of a number of plastic materials. Polyethylene, polypropylene and nylon comprise three materials that typify materials having the qualities preferred in forming the lower surface 22. For example, polyethylene having a thickness of at least about ⅛-inch thick is, it is believed, a preferred material. Such materials have the ability to withstand impacts, have a degree of resiliency and can isolate the rider somewhat from the effects of the impact when the vehicle is directed into engagement with a ground-supported object, can be formed to provide a smooth, snag-free lubricous surface, which is scratch resistant and resistant to breakage, are relatively inexpensive and can be inexpensively formed by processes such as injection molding. Other materials can be used for forming the lower surface such as smooth, hardened steel, fiber-reinforced plastics, polycarbonates, and the like.

While the drawings demonstrate a second means 20 as comprising a framework 24 of tubular members 24a, 24b, 24c bent to provide a supporting framework for a separate platform means 23 and lower surface-forming means 22, the second means can be formed by other means, such as one or more metal plates shaped to provide a platform 21, a smooth, snag-free lower surface 22, and the forward portion adapted to be connected with and supported by the first means 10. It is believed, however, that forming a frame 24 from two or more tubular members can provide sufficient strength and impact resistance while reducing the weight and the cost of the vehicle and should prove to be preferred.

As shown in the drawings, the third means 30 provides a rear wheel 31 supported by the rear ends of the outer pair of tubes 24a, 24c forming the frame 24 which are bent upwardly immediately behind the platform 21 to extend over the axle 32 of the rear wheel 31. A pair of tabs 33a and 33b are welded to and extend downwardly from the tubes 24a and 24c and are provided with openings such as downwardly extending slots to hold the axle 31a of the rear wheel 31 fastened into position on the vehicle.

In order to enhance the ability of the vehicle to perform tricks under the direction of the rider, the platform 21 and slidable lower portion 22 of the second means 20 of the vehicle are carried by the vehicle wheels only several inches above the ground to permit the rider to veer the vehicle sharply in one direction or another while positioning his weight and leaning into the turn. It is advisable that the platform 21 and lower surface 22 are underslung from the axes of rotation 12, 32 of the wheels 11, 31 by several inches.

In vehicles of the invention, it is preferable that the front and rear wheels have diameters of at least about 12 inches, but generally, no greater than about 22 inches, and with wheels having these diameters, that the lower surface 22 of the vehicle clear the ground by about 3 to 4 inches, but no more than about 6 to about 7 inches. Wheels with diameters from about 12 to about 22 inches, and preferably, about 16 to about 20 inches, permit the vehicle to travel rapidly down inclines, roll easily over uneven and soft ground, and to be "jumped" over and onto ground-supported objects. It is also preferable that the front and rear wheels be provided with air-filled tires having knobbed treads that will bite into the ground and provide a slip-free engagement between the wheels of the vehicle and the ground. Such tires also provide as a result of their air filling, a degree of cushioning and isolation of the rider from uneven ground, rocks and other bumps over which the vehicle may have to travel. In addition, one or both of the wheel suspensions of the vehicle may be provided with shock-absorbing mechanisms, such as shock absorbers built into the front fork and/or spring-biased swing arm support for the rear wheel. Furthermore, the wheels may be retained on the vehicle with quick release mechanisms.

As indicated above, the platform 21 should have sufficient length and sufficient width to permit an acrobatic rider to variously position his feet so that the vehicle may be veered sharply in both directions while traveling at a rapid rate and to position his body to counteract the centrifugal force resulting from such vehicle movements. The width of the upper platform 21 should be between at least about 6 inches to about 16 inches, and should have a length, extending between the front and rear wheels, of from at least about 14 inches to about 36 inches. It is believed that platforms having a width of about 8 to about 10 inches and a length of about 24 to about 27 inches will be preferred.

The lower slidable surface 22 will be coordinated with the length of the second means with its lower surface portion 22c covering the upwardly slopping front and bottom of the frame 24 and extending rearwardly to terminate just forwardly of the rear wheel 31. The slidable lower surface 22 has sufficient width to provide the side sliding edges 22a and 22b that are wider than. frame 24. In a prototype of the unit where the upper platform had a width of about 10 inches and the frame 24 has a width of about 5 inches, the width of the slidable lower surface 22 was about 6 inches. The wheel base of the vehicle between axes of rotation 12, 32 of the wheels is preferably about 36 inches or longer.

As shown in FIGS. 1 and 2, vehicles of the invention are preferably provided with hand-operated brakes to individually control braking of the front and rear wheels. Such brakes are preferably caliper actuated brakes with brake shoes (not shown), or possibly disc brakes, to frictionally engage the outer rims of the front and rear wheels 11, 31 as a result of the operation of a lever 18a, 18b at each grip 17a, 17b. Thus, a rider may easily apply braking force with one, or the other hand, or both hands, to one or the other or both of the two wheels of the vehicle.

Because the vehicle of the invention must be able to withstand impacts with stationary objects while carrying an adult rider that can weigh over 200 pounds and must be able to withstand the impact on either wheel as the vehicle returns to ground after being airborne, the means making up the vehicle must be constructed of strong, bend resistant materials. For example, in construction of a prototype of the vehicle the frame 24 was constructed with chrome-moly steel tubing having a 1½ inch outside diameter and a 1¼ inside diameter to resist bending and fracture. The front and rear wheels include strongly reinforced rims of the type used in mountain bikes. The means forming the platform of the prototype was constructed of ⅜ inch thick laminated wood of the highest quality with an abrasive (e.g., sandpaper) platform surface and the lower sliding surface was formed with ¼ inch thick polyethylene. The front and rear wheels of the vehicle were 14 inches in diameter and the lower surface 22 is carried by the wheels about 4 inches above the ground. Other materials may, of course, be used such as composite's with carbon fibers, titanium and the like.

Those skilled in the art will recognize that other embodiments of the invention than the prototype shown and described can be devised without departing from the spirit and scope of the invention as defined by the prior art and the following claims.

I claim:

1. A non-motorized adult scooter, comprising:
   a first means for providing a steerable front wheel that is rotatable about first axis of rotation;
   second means, connected with and supported by said first means, and including a wide upper platform for carrying substantially the entirety of both feet of a standing rider in a variety of positions and locations, and a lower portion removably fastened to the scooter and having a generally smooth and snag-free face entending opposite from said upper platform for omni-directional sliding engagement with the ground and ground-supported objects, said generally smooth and snag-free face extending longitudinally with said upper platform to and upwardly sloping surface adjacent said front wheel, an
   third means connected with and supporting said second means and carrying a rear wheel rotatable about a second axis of rotation.

2. A non-motorized adult scooter, comprising:
   a first means for providing a steerable front wheel that is rotatable about first axis of rotation;
   second means, connected with and supported by said first means, and including a wide upper platform for carrying substantially the entirety of both feet of a standing rider in a variety of positions and locations, and a lower portion having a generally smooth and snag-free face extending opposite from said upper platform for omni-directional sliding engagement with the ground and ground-supported objects extending longitudinally with said upper platform to an upwardly sloping surface adjacent said front wheel, and
   third means connected with and supporting said second means and carrying a rear wheel rotatable about a second axis of rotation,
   said lower portion defining a concavity extending longitudinally with said upper platform for encompassing at least an intermediate portion of a frame extending between said first means and said third means.

3. The adult scooter of claim 1 wherein said lower portion includes side edges adapted for engagement with the ground and ground-supported objects.

4. The adult scooter of claim 1 wherein said front and rear wheels have radii of at least about 12 inches, and
   the upper platform is supported by said first means and third means below said axes of rotation of said wheels.

5. The adult scooter of claim 4 wherein said front and rear wheels have radii less than about 22 inches.

6. The adult scooter of claim 1 wherein at least one of said wheels is supported by a shock absorber.

7. The adult scooter of claim 1 wherein said lower portion is comprised of a tough plastic material.

8. The adult scooter of claim 1 wherein said upper platform has a width of at least about 6 inches.

9. The adult scooter of claim 8 wherein said upper platform has a width of less than about 16 inches.

10. The adult scooter of claim 1 wherein said upper platform has a length of at least about 14 inches.

11. The adult scooter of claim 10 wherein said upper platform has a length of less than about 36 inches.

12. The adult scooter of claim 1 wherein said wheels include knobbed treads adapted to engage the ground with reduced slippage.

13. The adult scooter of claim 1 wherein said tires are air-filled to provide pneumatic cushioning.

14. The adult scooter of claim 1 wherein the distance between said axes of wheel rotation is at least about 3/6 inches.

15. The adult scooter of claim 14 wherein the distance between said axes of wheel rotation is less than about 66 inches.

16. The adult scooter of claim 1 wherein the lower portion is supported at least three inches above the ground.

17. The adult scooter of claim 17 wherein said lower portion is supported less than about 12 inches above the ground.

18. The adult scooter of claim 1 wherein at least one of said wheels is provided with a brake operable from said first means.

19. The adult scooter of claim 1 wherein both wheels are provided with brakes operable from said first means.

20. The adult scooter of claim 1 wherein said front and rear wheels are held to said scooter with quick release fastening means.

21. A non-motorized adult scooter, comprising:
a first means for providing a steerable front wheel that is rotatable about first axis of rotation;
second means, connected with and supported by said first means, and including a wide upper platform for carrying substantially the entirety of both feet of a standing rider in a variety of positions and locations, and a lower portion having a generally smooth and snag-free face and side edges extending opposite from said upper platform for omni-directional sliding engagement with the ground and ground-supported objects, said side edges of said lower portion being angled upwardly, said generally smooth and snag-free face extending longitudinally with said upper platform to an upwardly sloping surface adjacent said front wheel, and
third means connected with and supporting said second means and carrying a rear wheel rotatable about a second axis of rotation.

22. In a steerable, non-motorized, two-wheeled adult vehicle, the improvement comprising a standing platform and an omni-directional lower sliding surface below said standing platform and between the two wheels, said lower sliding surface having a generally closed, continuous, smooth and snag-free arcuate face extending opposite from said standing platform in a substantially closed assembly, said standing platform having sufficient width and length extending to a rearward inclined surface to support both feet of the rider in a variety of positions on the platform to permit an acrobatic rider to engage the lower sliding surface with the ground and ground-supported objects while pointed in multiple directions.

23. A non-motorized vehicle having a front wheel and a rear wheel for carrying a rider while standing and moving under the influence of gravity, comprising:
a standing platform sufficiently wide and long to support both feet of the rider in a variety of orientations and locations on the platform to permit the rider to apply body weight from side to side and front to rear of the platform while maintaining reliable contact between both feet and the platform,
a smooth, planar, snag-free surface-forming means below and connected with said standing platform, said surface-forming means extending along a longitudinal extent of said standing platform to an upwardly sloping surface extending above a plane coincident with the upper platform and adapted to be engaged by the rider with the ground and ground-supported objects,
a first fork for rotatably carrying said front wheel, said fork being pivotably connected with and supporting said platform and surface forming means by said front wheel and further connected with a handlebar to permit the rider to steer the vehicle, and
a second fork connected with said platform and surface-forming means for rotatably carrying said rear wheel.

24. The vehicle of claim 23 wherein said platform is at least about 6 inches wide and at least about 24 inches long.

25. The vehicle of claim 23 wherein said front and rear wheels have a diameter of at least about 12 inches, said platform is supported below the axes by rotation of said front and rear wheels, and said surface-forming means is supported several inches about the ground.

26. The vehicle of claim 23 wherein said surface-forming means comprises a replaceable plastic element forming a planar lower surface, an upwardly sloping forward ramp-like, forward surface and a pair of smooth, snag-free side surfaces.

27. The vehicle of claim 23 wherein said front and rear forks carry brakes for the front and rear wheels, and the handlebar carries individual hand-operated actuators for the brakes.

28. The vehicle of claim 23 wherein each of the front and rear wheels carries an air-filled tire with rough tread adapted for secure ground engagement and at least the front wheel is carried by a shock absorber system.

29. The vehicle of claim 23 wherein a strong tubular frame extends between the first and second forks, and the standing platform and surface-forming means are removably fastened to the strong tubular frame and to each other.

30. A non-motorized adult scooter, comprising:
a first means for providing a steerable front wheel that is rotatable about a first axis of rotation;
second means, connected with and supported by said first means, and including a wide upper platform for carrying substantially the entirety of both feet of a standing rider in a variety of positions and locations extending rearwardly to an upward inclination immediately adjacent a rear wheel of the scooter, and a lower portion having a generally smooth and snag-free closed, continuous arcuate face extending opposite from said upper platform for omni-directional sliding engagement with the ground and ground-supported objects, said lower portion being secured to said platform, said generally smooth and snag-free closed, continuous arcuate face extending longitudinally with said upper platform to an upwardly sloping surface adjacent said front wheel above a plane coincident with the upper platform, and
third means connected with and supporting said second means and carrying the rear wheel rotatable about a second axis of rotation.

31. A non-motorized vehicle having a front wheel and a rear wheel for carrying a rider while standing and moving under the influence of gravity, comprising:

a standing platform sufficiently wide and long to support both feet of the rider in a variety of orientations and locations on the platform to permit the rider to apply body weight from side to side and front to rear of the platform while maintaining reliable contact between both feet and the platform, the standing platform extending rearwardly to an upward inclination immediately adjacent the rear wheel of the vehicle, a smooth, planar, snag-free surface-forming means, a portion of which has a downwardly extending generally closed, continuous arcuate face below and connected with said standing platform, said surface-forming means extending along a longitudinal extend of said standing platform to an upwardly sloping surface above a plane coincident with the upper platform and adapted to be engaged by the rider with the ground and ground-supported objects, said standing platform and said surface-forming means secured in a rigid embracing relationship, a first fork for rotatably carrying said front wheel, said fork being pivotably connected with and supporting said platform and surface-forming means by said front wheel and further connected with a handlebar to permit the rider to steer the vehicle, and a second fork connected with said platform and surface-forming means for rotatably carrying said rear wheel.

32. The non-motorized vehicle of claim 31 further comprising a longitudinal beam extending between the first fork and the second fork and substantially fully encompassed by the assembly of the standing platform and surface-forming means.

\* \* \* \* \*